United States Patent [19]
Watts et al.

[11] Patent Number: 5,741,427
[45] Date of Patent: Apr. 21, 1998

[54] SOIL AND/OR GROUNDWATER REMEDIATION PROCESS

[75] Inventors: Richard J. Watts, Pullman, Wash.; Richard S. Greenberg, Mendham, N.J.

[73] Assignee: Anesys Corp., Wilmington, Del.

[21] Appl. No.: 615,976

[22] Filed: Mar. 14, 1996

[51] Int. Cl.$^6$ ............................................. C02F 1/72
[52] U.S. Cl. ..................... 210/747; 210/758; 210/759; 210/763; 502/325
[58] Field of Search ............................ 210/759, 763, 210/747, 758; 502/325

[56] References Cited

U.S. PATENT DOCUMENTS

| | | | |
|---|---|---|---|
| 3,200,069 | 8/1965 | Eisenhauer | 210/759 |
| 4,294,703 | 10/1981 | Wilms et al. | 210/759 |
| 4,363,215 | 12/1982 | Sharp | 210/759 |
| 4,370,241 | 1/1983 | Junkermann et al. | 210/759 |
| 4,388,194 | 6/1983 | Hills | 210/759 |
| 4,591,443 | 5/1986 | Brown et al. | |
| 5,043,080 | 8/1991 | Cater et al. | 210/759 |
| 5,266,214 | 11/1993 | Safarzedeh-Amiri | 210/759 |
| 5,435,666 | 7/1995 | Hassett et al. | |
| 5,520,483 | 5/1996 | Vigneri | |

OTHER PUBLICATIONS

Vesper et al.; "Solid Oxygen Source for Bioremediation in Subsurface Soils"; *Journal of Hazardous Materials*, 36 (1994) 265–274.

Watts et al.; "Hazardous Wastes Assessment, Management, and Minimization"; *Water Environment Research*, vol. 66, No. 4, pp. 435–440, Jun. 1994.

Watts et al.; "Oxidation of Sorbed Hexachlorobenzene in Soils Using Catalyzed Hydrogen Peroxide"; *Journal of Hazardous Materials*, 39 (1994) 33–47.

Watts et al., "Use of Iron Minerals in Optimizing the Peroxide Treatment of Contaminated Soils"; *Water Environment Research*, vol. 65, No. 7, pp. 839–844, Nov./Dec. (1993).

Tyre et al.; "Treatment of Four Biorefractory Contaminants in Soils Using Catalyzed Hydrogen Peroxide"; *Journal of Environmental Quality*, vol. 20, No. 4, Oct.–Dec. 1991, pp. 832–838.

Martens et al.; Feasibility of In Situ Chemical Oxidation of Refractile Chlorinated Organics by Hydrogen Peroxide––Generated Oxidative Radicals in Soil; *Emerging Technology for Bioremediation of Metals*, pp. 74–84.

Alexander; "Biodegradation of Organic Chemicals"; *Environ. Sci. Technol.*, vol. 18, No. 2, 1985, pp. 106–111.

Barbeni et al.; "Chemical Degradation of Chlorophenols with Fenton's Reagent"; *Pergamon Journals Ltd.*, vol. 16, Nos. 10–12, pp. 2225–2237; 1987.

Baxendale et al.; "The Oxidation of Benzene by Hydrogen Peroxide and Iron Salts"; *Disc. Faraday Soc.*, 14:160–167 (1953).

Bowers et al.; "Treatment of Toxic or Refractory Wastewaters with Hydrogen Peroxide"; *Wat. Sci. Tech.*, vol. 21, Brighton, pp. 477–486, 1989.

Dorfman et al.; "Reactivity of the Hydroxyl Radical in Aqueous Solutions"; *National Standard Reference Data System*; Issued Jun. 1973; pp. 1–62.

Edkenfelder; "Industrial Water Pollution Control"; Second Edition; Chapter 10, pp. 300–311.

Eisenhauer; "Oxidation of Phenolic Wastes"; *Journal WPCF*, vol. 36, No. 9, pp. 1116–1128 (1964).

Fenton; "Oxidation of Tartaric Acid in Presence of Iron"; *Journal of the Chemical Society*, 65, 897–910 (1894).

Larsen et al.; "The Effect of pH and Buffer Ions on the Degradation of Carbohydrates by Fenton's Reagent"; *Acta Chemica Scandinavica*, 21 (1967) 552–564.

Murphy et al.; "A Fenton–like Reaction to Neutralize Formaldehyde Waste Solutions"; *Environ. Sci. Technol.*, 1989, 23, 166–169.

Pardieck et al.; "Hydrogen Peroxide use to Increase Oxidant Capacity for In Situ Bioremediation of Contaminated Soils and Aquifiers: A Review"; *Journal of Contaminant Hydrology*, 9(1992) 221–242.

Walling; "Fenton's Reagent Revisited"; *Accounts of Chemical Research*; pp. 126–131 (1974).

Watts; "Hydrogen Peroxide for Physicochemically Degrading Petroleum–Contaminated Soils"; *Remediation*, Autumn 1992, pp. 413–425.

Cosgrove et al.; "The Oxidation of Phenols with the Free Hydroxyl Radical"; Paper –ACS Meeting 1950, pp. 1726–1730.

Spain et al.; "Excessive Bacterial Decomposition of $H_2O_2$ During Enhanced Biodegradation"; vol. 27, No. 2 –Ground Water –Mar.–Apr. 1989, pp. 163–167.

Piotrowski; "In Situ Groundwater Bioremediation Case History Contaminated Aquifer"; *Hazardous Waste Management Magazine*, Apr. 1989, pp. 20–21.

Piotrowski; "In Situ Designs For Aquifer Cleanup"; *Environmental Protection*; May 1992; pp. 34–49.

Barcelona et al.; "Oxidation–Reduction Capacities of Aquifer Solids"; *Environ. Sci. Technol*, vol. 25, No. 9, 1991; pp. 1565–1572.

Watts et al.; "Treatment of Pentachlorophenol–Contaminated Soils Using Fenton's Reagent"; *Hazardous Waste & Hazardous Materals*; vol. 7, No. 4, 1990; pp. 335–345.

*Primary Examiner*—Neil McCarthy
*Attorney, Agent, or Firm*—Watov & Kipnes, P.C.

[57] ABSTRACT

A method of treating contaminants in soil and/or groundwater comprising adding a source of an oxidizing agent and a reaction product complex of a ligand donor and a metal catalyst to the in situ environment and the reaction product complex employed therein.

4 Claims, No Drawings

1

SOIL AND/OR GROUNDWATER REMEDIATION PROCESS

FIELD OF THE INVENTION

The present invention is directed to methods and systems for converting contaminants contained in soil and/or groundwater to non-contaminating or harmless compounds. The methods and systems include treatment of the contaminants with an oxidizing agent and a complex formed from the reaction of a ligand donor and a metal catalyst to thereby promote and control the conversion of the contaminants through use of the oxidizing agent.

BACKGROUND OF THE INVENTION

The treatment of contaminated soils and groundwater has gained increased attention over the past few years because of the increasing number of uncontrolled hazardous waste disposal sites. It is well documented that the most common means of site remediation has been excavation and landfill disposal. While these procedures remove contaminants, they are extremely costly and in some cases difficult if not impossible to perform.

More recently, research has focused on the conversion of contaminants contained in soil and groundwater based on the development of on-site and in situ treatment technologies. One such treatment has been the incineration of contaminated soils. The disadvantage of this system is in the possible formation of harmful byproducts including polychlorinated dibenzo-p-dioxins (PCDD) and polychlorinated dibenzofurans (PCDF).

In situ biological soil treatment and groundwater treatment is another such system that has been reviewed in recent years. So-called bioremediation systems, however, have limited utility for treating waste components that are biorefractory or toxic to microorganisms.

Such bioremediation systems were the first to investigate the practical and efficient injection of hydrogen peroxide into groundwater or soils. These investigations revealed that the overriding issue affecting the use of hydrogen peroxide in situ was the instability of the hydrogen peroxide down-gradient from the injection point. The presence of minerals and the enzyme catalase in the subsurface catalyzed the disproportionation of hydrogen peroxide near the injection point, with rapid evolution and loss of molecular oxygen, leading to the investigation of stabilizers as well as biological nutrients.

During the early biological studies from the 1980s, some investigators recognized the potential for competing reactions, such as the direct oxidation of the substrate by hydrogen peroxide. Certain researchers also hypothesized that an unwanted in-situ Fenton's-like reaction under native conditions in the soil was reducing yields of oxygen through the production of hydroxyl radicals. Such a mechanism of contaminant reduction in situ was not unexpected, since Fenton's-type systems have been used in ex situ systems to treat soil and groundwater contamination.

Other investigators concomitantly extended the use of Fenton's-type systems to the remediation of in situ soil systems. These studies attempted to correlate variable parameters such as hydrogen peroxide, iron, phosphate, pH, and temperature with the efficiency of remediation.

As with the bioremedial systems, in situ Fenton's systems were often limited by instability of the hydrogen peroxide in situ and by the lack of spatial and temporal control in the formation of the oxidizing agent (hydroxyl radical) from the hydrogen peroxide. In particular, aggressive/violent reactions often occurred at or near the point where the source of the oxidizing agent (the hydrogen peroxide) and the metal catalyst were injected. As a consequence, a significant amount of reagents including the source of the oxidizing agent (hydrogen peroxide) was wasted because activity was confined to a very limited area around the injection point.

It would be of significant advantage in the art of removing contaminants from soil and/or groundwater to provide a system by which the source of the oxidizing agent and the metal catalyst can travel from the injection point throughout the aerial extent of the contamination in order to promote efficient destruction of the contaminant plume. It would therefore be of significant benefit to the art to provide a system by which the source of the oxidizing agent is stabilized to allow dispersion throughout the plume and by which the catalytic turnover rate of the metal catalyst is moderated in order to promote more efficient destruction of contaminants throughout the plume. It would be of further benefit to provide an injection method in which the reagents are injected at the time, concentration, and location most suitable for efficient conversion of the contaminants at the specific site. It would be a further advance in the art to provide an efficient system for quantitatively detecting the concentration of the oxidizing agent so that the proper amount of oxidizing agent can be injected in situ for converting the contaminants to harmless compounds.

SUMMARY OF THE INVENTION

The present invention is directed to methods and systems for treating contaminants in an in situ environment in which an oxidizing agent and a unique reagent comprised of a reaction product complex formed from the reaction of a ligand donor and a metal catalyst is provided to the in situ environment to thereby reduce or eliminate contaminants present therein.

In accordance with one aspect of the invention, there is provided a method and system of treating contaminants in an in situ environment comprising adding a source of an oxidizing agent, preferably a stabilized source of an oxidizing agent, capable of oxidizing at least one of the contaminants and a unique complex formed as a reaction product of a ligand donor and a metal catalyst, to the in situ environment in an effective amount sufficient to at least reduce the concentration of at least one of the contaminants in the in situ environment. The use of the source of the oxidizing agent and the reaction product complex enables temporal and spatial control of the oxidation process so that the oxidizing agent is able to be generated into areas where contaminants are present. As a result, aggressive/violent reactions at the point of injection are minimized and less oxidizing agent is wasted.

In accordance with a further aspect of the invention, the stabilized oxidizing agent and the reaction product complex are preferably injected into a specific area of the in situ environment known as the capillary fringe. The capillary fringe is that portion of the contamination site which lies just above the water table. Destruction of contamination in the capillary fringe is preferred because it prevents the contamination which is often adsorbed in the capillary fringe from serving as a continuing source of groundwater and soil contamination.

In accordance with another aspect of the invention, the methods and systems herein can be applied to oxidizing contaminants in formations which are difficult to access such as fractured bedrock. In particular, the source of the oxidizing agent and the reaction product complex are injected at elevated pressures into the fractured bedrock to treat contaminants whose density is greater than water and are often trapped in bedrock fractures.

In a further aspect of the invention, the source of the oxidizing agent and the reaction product complex are injected into the in situ environment to enhance the operation and efficiency of traditional remediation technologies such as pump and treat and solvent vapor extraction systems. The present invention enhances these conventional systems that are based on mechanical removal of the contaminants. This is because the oxidation reactions which convert the contaminants to harmless compounds also enhance desorption of the contaminants from organic carbon in soil and/or groundwater and generally result in enhanced volatilization. The break down of contaminants into smaller compounds and the increased production of carbon dioxide in the method of the present invention also enhance volatilization and reduce adsorption to organic carbon in the soil.

In a further aspect of the invention there is provided a system for quantitatively detecting the concentration of the oxidizing agent in the in situ environment. This system is used to assess site-specific parameters such as the efficacy of stabilization of the source of the oxidizing agent and the subsequent conversion of the source to the oxidizing agent.

DETAILED DESCRIPTION OF THE INVENTION

The present invention is directed to methods and systems for removing contaminants from soil and/or groundwater by converting the same to harmless byproducts. Such contaminants typically arise from petroleum storage tank spills or from intentional or accidental discharge of liquid hydrocarbons or compositions containing the same. Typical examples of contaminants are hydrocarbons including, but not limited to: gasoline, fuel oils, benzene, toluene, ethylbenzene, xylenes, naphthalene, pesticides, herbicides and other organic compounds; lubricants; chlorinated solvents, including polychlorinated biphenyls (PCBs), and pentachlorophenol (PCP); and metals, cyanides and the like. The list of contaminants provided herein is exemplary. It should be understood, however, that other contaminants capable of being oxidized into harmless compounds, such as carbon dioxide and water, is within the purview of the present invention.

In accordance with the present invention, the methods and systems for remediation of a contaminated environment in situ is performed by providing a complex in the form of a reaction product of a metal catalyst and a ligand donor and injecting the same along with a source of the oxidizing agent, preferably stabilized, as hereinafter described. Complexing of the ligand donor with the metal catalyst moderates the catalytic turnover rate of the metal catalyst.

In one embodiment of the invention, the reaction product complex and the stabilized source of the oxidizing agent are alternately injected (i.e. pulsed) into the soil and/or groundwater, preferably with the first injection being the reaction product complex. In another embodiment of the invention, the stabilized source of the oxidizing agent is added to the in situ environment and allowed to disperse or migrate throughout the plume. Subsequently, the reaction product complex is injected into the in situ environment in at least one injection point throughout the plume. Applicants have determined that the reaction product complex of the catalyst and the ligand donor provides more control over the formation of the oxidizing agent.

In particular, the present reaction product complex of the catalyst and ligand donor moderates the catalytic turnover rate for a longer time and for a further distance from the injection point to provide enhanced spatial and temporal control in the formation of the oxidizing agent. The oxidation efficiency of the present invention is therefore superior to prior art systems. Although not wishing to be bound by any theory, it is believed that the reaction product complex promotes a more moderate rate of turnover of the catalytic system thereby harnessing its ability to promote the production of the oxidizing agent away from the injection point.

The sources of oxidizing agents employed in the present invention are those that typically generate free radicals (e.g. hydroxyl radicals) and include peroxides such as hydrogen peroxide, calcium peroxide, sodium peroxide, and permanganates such as potassium permanganate and the like. Calcium peroxide generates hydroxyl radicals under acidic conditions in the presence of iron (II) salts. Calcium peroxide is very slightly soluble in water and is generally more expensive than hydrogen peroxide. However, calcium peroxide can be used as an effective source of oxidizing agent for hydrocarbon-contaminated sites. Sodium peroxide has been found to behave in a manner similar to calcium peroxide and can be used as well.

Another suitable source of the oxidizing agent is ozone. Ozone has previously been used as a disinfectant and in more recent applications to oxidize refractory organic contaminants. Ozone under well known conditions can generate hydroxyl radicals which is a preferred oxidizing agent.

The peroxides and ozone, as exemplary hydroxyl radical producing compounds, can be used alone or in combination with ultraviolet radiation. What is essential is that the source of the oxidizing agent be capable of generating hydroxyl radicals in sufficient quantity to convert existing contaminants (hydrocarbons) to harmless compounds (e.g. carbon dioxide and water vapor).

Prior to injection, the source of the oxidizing agent is preferably stabilized. Suitable stabilizers include acids and salts thereof. The most preferred acid is phosphoric acid and the most preferred salt is monopotassium phosphate.

The reaction product complex employed in the present invention is obtained from the reaction of a metal catalyst for the oxidizing agent and a ligand donor. Suitable catalysts include metal salts, iron oxyhydroxides, iron chelates, manganese oxyhydroxides and combinations thereof. Preferred metal salts include iron (II) and (III) salts, copper (II) salts and manganese (II) salts. Preferred iron salts are selected from the group consisting of ferrous sulfate, ferric sulfate, ferrous perchlorate, ferric perchlorate, ferrous nitrate and ferric nitrate.

Preferred iron oxyhydroxides include goethite, hematite and magnetite. Iron chelates include, for example, Fe(III)-NTA, Fe(III)-hydroxyethyliminodiacetic acid (HEIDA), Fe(III)-mucic acid, Fe(III)-malonic acid, Fe(III)-ketomalonic acid, Fe(III)-DL-tartaric acid, Fe(III)-citric acid, Fe(III)-oxalic acid, Fe(III)-gallic acid, Fe(III)-picolinic acid, Fe(III)-dipicolinic acid, Fe(III)-catechol, Fe(III)-1,2-dihydroxybenzoic acid, Fe(III)-quercertin, Fe(III)-pyrocatechol violet, Fe(III)-alizarin red, Fe(III)-rhodizonic acid, Fe(III)-tetrahydroxy-1,4-quinone, Fe(III)-ascorbic acid, and Fe(III)-hexaketocyclohexane (HKCH).

Ligand donors which can be employed for formation of the reaction product complex generally comprise acids, salts of acids and combinations thereof. Acids include phosphoric acid, acetic acid, citric acid, carbonic acid, boric acid, silicic acid and the like. The preferred acid is phosphoric acid. The preferred salts include monopotassium phosphate, silicates such as sodium silicate, citrates such as sodium citrate, acetates such as sodium acetate and the like.

The most preferred catalyst is iron sulfate and the most preferred ligand donors are phosphoric acid and monopotassium phosphate. A typical molar ratio for the formation of the reaction product complex is from about 0.5–1.5 moles of metal catalyst to 1 mole of ligand donor.

The reaction of the catalyst and the ligand donor is preferably performed on site at ambient temperatures by mixing the catalyst and ligand donor with water to enhance dissolution. A typical range for the molar ratio of the source of oxidizing agent to the reaction product complex is in the range of from about 5 to 20:1.

The in situ environment for most soil and/or groundwater sites includes a water table which is the uppermost level of the below-ground, geological formation that Water pressure in water. Water pressure in the pores of the soil or rock is equal to atmospheric pressure. Above the water table is the unsaturated zone or vadose region comprising the upper layers of soil in which pore spaces or rock are filled with air or water at less than atmospheric pressure. The capillary fringe is that portion of the vadose region which lies just above the water table.

The capillary fringe is formed by contact between the water table and the dry porous material constituting the vadose region. The water from the water table rises into the dry porous material due to surface tension because of an unbalanced molecular attraction of the water at the boundary, thus forming the capillary fringe.

The source of the oxidizing agent and the reaction product complex can be administered to the in situ environment by any method considered conventional in the art. For example, administration can be directly into the groundwater through a horizontal or vertical well or into subterranean soil through a well or infiltration trenches at or near the site of contamination. In a preferred form of the invention, the stabilized source of the oxidizing agent and reaction product complex are administered into the capillary fringe of the contaminated site through wells or trenches and the like.

As previously indicated, the reagents of the present invention can be administered under elevated pressures into hard to reach places such as fractures within underlying bedrock. These fractures are collecting places for contaminants which are typically more dense than water. When administered the present reagents are able to penetrate the fractures, contact the contaminants and convert the same to harmless compounds.

Injection of the stabilized source of the oxidizing agent and the reaction product complex can be accomplished by installing steel lined wells or open hole type wells into the bedrock. Packers and bladders conventionally employed in downhole drilling can be employed to assist in isolating discrete fractures and accessing the contaminants with the reagents. The reagents are then injected into the fractures at applied elevated pressures, typically in the range of from about 40 to 100 psi.

The administration of the present reagents into the in situ environment including bedrock fractures under elevated pressures can be accomplished either alone or in conjunction with conventional treatment systems. Such systems include pump and treat systems which pump the contaminated groundwater out of the in situ environment and solvent vapor extraction systems in which a vacuum is applied to the site of contamination to physically enhance volatilization and desorption of the contaminants from soil and/or groundwater.

As indicated above, the stabilized source of the oxidizing agent and the reaction product complex can be administered directly into the in situ environment. In a preferred form of the invention, the amount of the reagents and the number of treatment cycles are predetermined. For example, samples of the contaminated soil and/or groundwater are taken and the concentrations of the respective reagents required for in situ treatment are then determined based on the amount of the reagents needed to at least substantially rid the samples of the contaminants contained therein.

More specifically, a sample of the soil and/or groundwater is analyzed to determine the concentration of the contaminants of interest (e.g. hydrocarbons). Analysis of volatile hydrocarbons can be made by gas chromatographic/mass spectrometric systems which follow, for example, EPA Method 624. Semi-volatiles are analyzed in a similar manner according to, for example, EPA Method 625.

Results from these analyses are used to determine the reagent combinations for treatment of the sample based on the type and concentration of the contaminants. A specific molar ratio of the reagents is used for the sample based on prior research, comparative samples and the like. Typical sample volumes can be in the range of from about 120 to 150 ml.

Sample analysis is also employed to determine the number of treatment cycles which may be necessary to achieve the desired reduction in the level of contaminants. While one treatment cycle may be used, it is often desirable to employ a plurality of treatment cycles depending on the type and concentration of pollutants. The number of treatment cycles is determined in part by monitoring the performance of the reagents, particularly the oxidizing agent once injected into the soil and/or groundwater.

In operation, a catalyst such as an iron (II) salt is premixed with a predetermined quantity of a ligand donor such as a mixture of phosphoric acid/monopotassium phosphate. The reaction product complex comprised of the catalyst and ligand donor and the stabilized source of the oxidizing agent are injected into sealed vials with a syringe. The reagent doses are given as hourly treatment cycles with the expectation that the samples will typically require as few as one treatment cycle and as many as five treatment cycles in order to substantially or completely convert the contaminants to harmless byproducts.

A control sample is set up for each type of sample undergoing the study to correct for any volatization loss. All experimental vials are allowed to sit overnight at room temperature. On the following day the samples are analyzed to determine the concentration of contaminants by the above-mentioned EPA procedure. Once the results are obtained, they may be extrapolated to provide a suitable amount of the stabilized source of the oxidizing agent and reaction product complex necessary to treat the contaminants in situ.

Injection of the stabilized source of the oxidizing agent and reaction product complex may be performed under both applied and hydrostatic pressure into the in situ environment. Flow rates will vary depending on the subsurface soil characteristics with faster rates associated with more highly permeable soils (e.g. gravel and/or sand). Slower rates as low as 0.1 gallons per minute may be used for less permeable soils (e.g. clays and/or silts). The stabilized source of the oxidizing agent and reaction product complex may be injected into the subsurface and allowed to stabilize over a specific period, typically about 24 hours. The stabilization period may be varied depending on the soil type.

In less permeable soils, injection procedures are preferably associated with a pressurized system. A typical system involves injection wells installed with screens set at specific levels to allow for higher pressures and countered by pumping into less permeable soils. The pumping system can include a low horsepower pump at pressures ranging from between about 10 and 40 lbs. per square inch. The stabilized source of the oxidizing agent and reaction product complex may be pumped in short pulse injections or in a long steady flow as desired.

In a preferred form of the invention, the stabilized source of the oxidizing agent and reaction product complex are injected directly into the capillary fringe, located just above the water table. This can be accomplished in a conventional manner by installing a well screened in the capillary fringe and injecting the reagents into the well screen.

Once the stabilized source of the oxidizing agent and reaction product complex are injected into the in situ environment, it is desirable to monitor the performance of the reagents and the extent to which contaminants are removed.

In particular, the effects of naturally occurring minerals including their reactivity with the stabilized source of the oxidizing agent can have a dramatic effect on the extent of the formation of the oxidizing agent. In accordance with an embodiment of the invention the concentration of the oxidizing agent contained within the in situ environment is measured and is an indication of the concentration of the reagents remaining at the point of injection. This concentration is expressed as a fraction which is proportional to the total number of treatment cycles originally recommended for the site from the laboratory study.

In particular, the preferred monitoring system employs a free radical trap to directly measure the concentration of the oxidizing agent contained within the in situ environment. More specifically, a sample of the soil and/or groundwater is combined with a specified amount of a free radical trap such as methylene blue dye. The mixture is stabilized and precipitated and/or colloidal matter removed. The absorbance of the color remaining in the sample is measured using a spectrophotometer at a wave length capable of measuring the absorbance of the blue dye (e.g. 662 nm). The absorbance value is then compared to the standard curve of absorbance vs. reagent value determined for the particular site.

The free radical concentration of the sample is expressed as a reagent value (R) which is proportional to the concentration of the radical and is representative of the amount of the reagents initially added that are remaining at that point as shown in Table #1. This amount is expressed as a fraction proportional to the total number of treatment cycles X, wherein X is the number of treatment cycles originally recommended for the sample.

TABLE #1

| Reagent Value (R) | Explanation |
|---|---|
| 2 | 100% of the reagents initially added are still present. The amount of free radicals produced in 10 minutes is highest for this sample. |
| 1 | 50% of the reagents initially added are still remaining in the sample. The amount of free radicals produced in 10 minutes for R = 1 sample is one half the amount produced for R = 2 sample. |

TABLE #1-continued

| Reagent Value (R) | Explanation |
|---|---|
| 0.5 | 25% of the reagents initially added are still remaining in the sample. The amount of free radicals produced in 10 minutes for R = 0.5 sample is one quarter the amount produced for R = 2 sample. |

EXAMPLE 1

For Example 1, the process of the present invention was performed on a delineated contaminant plume located downgradient of a former underground storage tank (UST) over a two week period. The contamination included chlorinated volatile organic compounds (VOCs) located within the subsurface groundwater. Treatment involved introducing a stabilized source of the oxidizing agent (hydrogen peroxide stabilized with monopotassium phosphate acid) and a reaction product complex comprised of a complex formed from iron (II) sulfate and a mixture of phosphoric acid and monopotassium phosphate into designated injection points located within the capillary fringe upgradient of the plume area.

Prior to any field activities, a groundwater sample (Sample Point #1) was collected which exhibited typical levels of contaminants at the site. The sample was evaluated through a series of laboratory oxidation studies. Varying ratios of the stabilized source of the oxidizing agent and the reaction product complex were used and recorded to determine optimum quantities for treatment to be completed. Results of the laboratory studies indicated over a 99% destruction in total VOCs in the groundwater sample, and are shown in Table #2 below:

TABLE #2

| VO Compound | Original Sample Point #1 (ppb) | Treated Sample Point #2 (ppb) |
|---|---|---|
| Vinyl chloride | 998 | 1.03 |
| 1,1-Dichloroethene | 12.4 | ND |
| Methylene Chloride | ND | ND |
| trans-1,1-Dichloroethene | 21.4 | ND |
| Trichloroethene | 41.1 | ND |
| Tetrachloroethene | 12.2 | ND |
| Ethylbenzene | ND | ND |
| Xylenes, total | ND | ND |
| Total VO's | 1,085.1 | 1.03 |
| Tentatively Identified Compound | (ppb) | (ppb) |
| cis-1,2-Dichloroethene | 58,200 | 3.70 |
| Total TIC's | 58,200 | 3.70 |
| Total VO's and TIC's | 59,285.10 | 4.73 | ppb - parts per billion or micrograms per liter (µg/L)
ND - analyzed for but not detected Following regulatory review and approvals, a pilot program was performed on a portion of the delineated contaminant plume over a two week period. Treatment consisted of introducing the same stabilized source of the oxidizing agent and reaction product complex into designated injection points. The points consisted of four inch diameter (4"Ø) injections ports constructed into the capillary fringe upgradient of the plume area. The delivery system is comprised of an assemblage of equipment, piping, and control valves connected at the injection port to allow varying quantities of reagents to be discharged into the capillary fringe.

The optimum stoichiometry determined during the lab study was utilized along with the current level of contamination, volume of area to be treated, and subsurface characteristics in determining the treatment volume used during the pilot program at the site. Approximately 155 gallons of the stabilized source of the oxidizing agent and the reaction product complex were utilized for this site, with flow rates varying between 0.1 and 0.5 gal/min.

Monitoring was performed during the pilot program to obtain information related to the treatment process and subsurface characteristics. Samples were collected prior to treatment and four (4) weeks after the completion of the pilot study. Samples were analyzed for volatile organics plus a forward library search (VO+10), total iron and total organic carbon. Quantitative tests for measuring the concentration of hydrogen peroxide and for detecting hydroxyl radicals directly utilizing a color free radical trap were also performed during the pilot program.

Results of the pilot program indicated over a 99% decrease in total volatile organic contamination within the treated areas. The results are set forth in Table #3 below.

TABLE #3

| VO Compound | Original Sample Point #1 (ppb) | Treated Sample Point #2 (ppb) |
|---|---|---|
| Vinyl chloride | 834 | ND |
| 1,1-Dichloroethene | ND | ND |
| Methylene Chloride | ND | 1.22 |
| trans-1,1-Dichloroethene | 18.8 | ND |
| Trichloroethene | 38.4 | ND |
| Tetrachloroethene | ND | ND |
| Ethylbenzene | ND | ND |
| Xylenes, total | ND | ND |
| Total VO's | 891.2 | 1.22 |
| Tentatively Identified Compound | (ppb) | (ppb) |
| cis-1,2-Dichloroethene | 47,200 | 305.5 |
| Total TIC's | 47,200 | 305.5 |
| Total VO's and TIC's | 48,091.2 | 306.72 | ppb - parts per billion or micrograms per liter (μg/L)
ND - analyzed for but not detected

We claim:

1. A reagent for use in the treatment of contaminants in an in situ environment comprising a reaction product complex produced by the process comprising:

(a) preparing a first aqueous solution comprising an effective amount of a ligand donor selected from at least one member of the group consisting of a mixture of phosphoric acid and monopotassium phosphate, a mixture of phosphoric acid, monopotassium phosphate and sulfuric acid, and combinations thereof;

(b) preparing a second aqueous solution comprising an effective amount of a metal catalyst selected from at least one member of the group consisting of Fe (II) salts, Fe (III) salts, Fe (II) iron chelates, Fe (III) iron chelates and combinations thereof; and (c) combining said first and second aqueous solutions at a molar ratio of said second aqueous solution to said first aqueous solution in the range of from about 0.5 to 1.5:1.

2. The reagent of claim 1 wherein the metal catalyst is Fe (II) sulfate.

3. The reagent of claim 1 wherein the metal catalyst is Fe (II) EDTA chelate.

4. A method of treating contaminants in an in situ environment comprising (a) preparing a first aqueous solution comprising an effective amount of a ligand donor selected from at least one member of the group consisting of a mixture of phosphoric acid and monopotassium phosphate, a mixture of phosphoric acid, monopotassium phosphate and sulfuric acid and combinations thereof;

(b) preparing a second aqueous solution comprising an effective amount of a metal catalyst selected from at least one member of the group consisting of Fe (II) salts, Fe (III) salts, Fe (II) chelates, Fe (III) chelates and combinations thereof;

(c) combining said first and second aqueous solutions at a molar ratio of said second aqueous solution to said first aqueous solution in the range of from about 0.5 to 1.5:1; and (d) adding said combined solutions to said in situ environment in the presence of an oxidizing agent in an amount sufficient to treat said contaminants.

* * * * *